(12) United States Patent
Lescroart

(10) Patent No.: US 7,631,613 B2
(45) Date of Patent: Dec. 15, 2009

(54) MOBILE DRY FOOD DISPENSER FOR ANIMALS

(76) Inventor: Pascal Lescroart, 463 Chemin du Micocoulier, Villeneuve Loubet (FR) 06270

(*) Notice: Subject to any disclaimer, the term of this patent is extended or adjusted under 35 U.S.C. 154(b) by 104 days.

(21) Appl. No.: 11/913,411

(22) PCT Filed: Apr. 10, 2006

(86) PCT No.: PCT/FR2006/000787
§ 371 (c)(1), (2), (4) Date: Nov. 2, 2007

(87) PCT Pub. No.: WO2006/123026
PCT Pub. Date: Nov. 23, 2006

(65) Prior Publication Data
US 2008/0178813 A1   Jul. 31, 2008

(30) Foreign Application Priority Data
May 19, 2005   (FR) .................................. 05 05065

(51) Int. Cl.
*A01K 15/02*   (2006.01)
*A01K 29/00*   (2006.01)
(52) U.S. Cl. .................................. 119/51.01; 119/710
(58) Field of Classification Search .............. 119/51.01, 119/701, 709, 710, 711
See application file for complete search history.

(56) References Cited
U.S. PATENT DOCUMENTS

| | | | | |
|---|---|---|---|---|
| 1,022,112 A | * | 4/1912 | Smith | ......................... 119/711 |
| 1,137,642 A | * | 4/1915 | Lingner | ...................... 206/121 |
| 5,191,856 A | * | 3/1993 | Gordon | ...................... 119/711 |
| 5,865,147 A | * | 2/1999 | Rubin | ......................... 119/711 |
| 6,073,581 A | | 6/2000 | Wang et al. | |
| 6,098,571 A | * | 8/2000 | Axelrod et al. | .............. 119/707 |
| 6,158,391 A | * | 12/2000 | Simonetti | .................... 119/707 |
| 6,453,602 B1 | * | 9/2002 | Russell et al. | .................. 43/100 |
| 6,631,800 B1 | * | 10/2003 | Keeven | ......................... 206/37 |
| 6,666,167 B1 | | 12/2003 | Carlson | |
| 6,711,849 B1 | * | 3/2004 | Moretti | ...................... 43/44.99 |
| 6,941,895 B2 | * | 9/2005 | St. Pierre | .................... 119/711 |
| 7,246,574 B2 | * | 7/2007 | Renforth | ...................... 119/711 |
| 7,389,748 B2 | * | 6/2008 | Shatoff et al. | ................ 119/707 |
| 2008/0083378 A1 | * | 4/2008 | Pearce | ......................... 119/707 |

FOREIGN PATENT DOCUMENTS

DE   200 02 121 U1   5/2000

* cited by examiner

*Primary Examiner*—Yvonne R. Abbott
(74) *Attorney, Agent, or Firm*—Young & Thompson

(57) ABSTRACT

A device which dispenses pellets when rolled by an animal includes a central part having two cylinders, one of which is nested inside the other, which are equipped with holes of the same size. All or some of the holes in the two cylinders can be aligned more or less completely by manually rotating the external cylinder around the internal cylinder, such that a given number of pellets are released from the central part each time the device is rotated. The device also includes two wheels, one of which is equipped with a stopper. The two wheels are fixed to the ends of the internal cylinder by screwing or gluing and with the aid of a double bayonet, and the cylinders are maintained in the selected relative position by a gear tooth system. The device is particularly suitable for use as a toy, for exercise and to slow down ingestion.

4 Claims, 8 Drawing Sheets

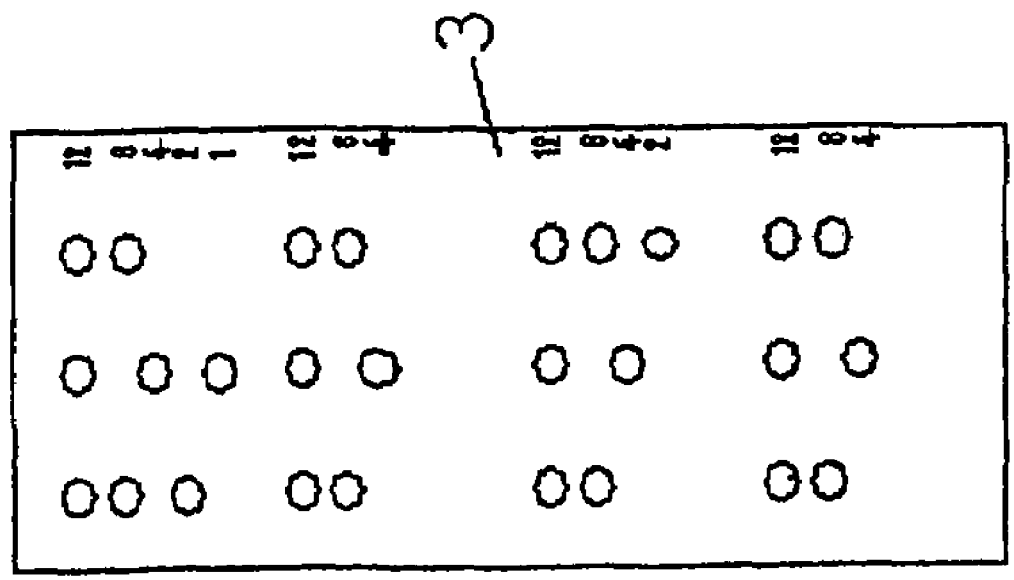
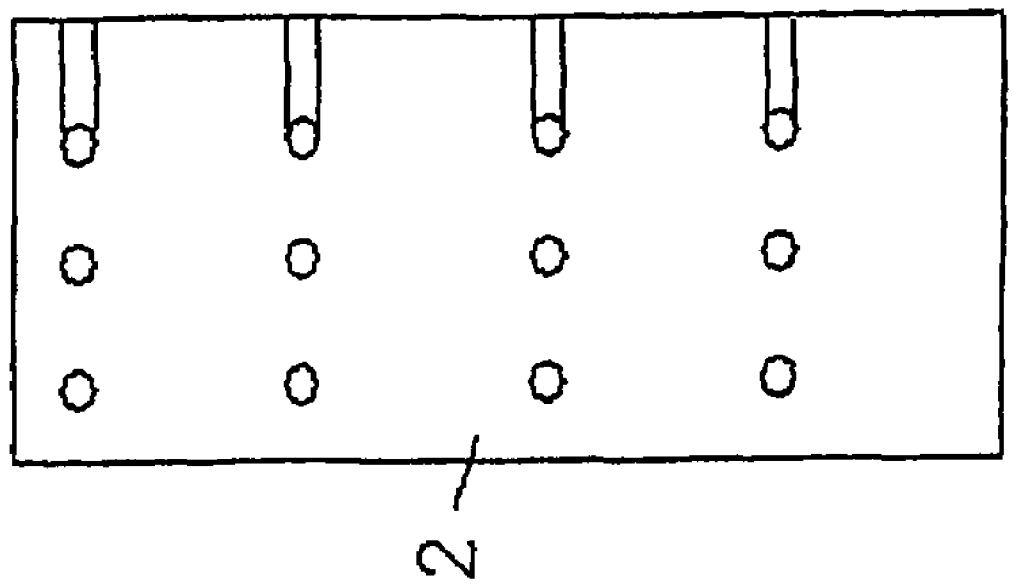
FIGURE 7

MOBILE DRY FOOD DISPENSER FOR ANIMALS

This invention relates to a device for dispensing dry food in pellets to animals which roll this device on the ground.

The existing distributors are fixed and do not need to be moved for supplying the pellets to the animals.

The device according to the invention obliges the animal to make a physical effort to move this device and obtain the pellets, with the following aims: play activity, physical activity for an animal that is too sedentary, slowing of speed of ingestion of the pellet.

The device according to the invention enables these aims to be achieved. In fact, according to a first characteristic, it comprises a central part (1) comprising an inner cylinder (2) nested inside an outer cylinder (3), both cylinders in the horizontal position and having a different number of holes (4) of the same size at precise locations on their surface, wherein these holes can be superimposed in a desired number by manual rotation of the outer cylinder around the inner cylinder, the superposition obtained being either partial or total (6) to provide the channels formed by this superposition of holes a dimension corresponding to that of the pellets placed in the cylinder, enabling them to be released each time the device is rotated by the animal.

The device according to the invention comprises, according to a second characteristic, a wheel (7) at each end of the cylinders made integral with the inner cylinder.

According to a third characteristic, one of the wheels is fixed by screwing or gluing (9), the other by a double bayonet type system (8) enabling the device to release the outer cylinder for positioning it, then to lock it between the inner walls of the two wheels in the position selected for the channels (10), without completely dismantling it.

The device according to the invention comprises, according to a fourth characteristic, teeth on an inner face (11) of the screwed or glued wheel, as well as on an entire end of the outer cylinder (12), making it possible, by nesting between these teeth, to position the inner cylinder with precision with respect to the outer cylinder before the wheels are fully tightened.

The device according to the invention comprises, according to a fourth characteristic, a stopper (13) that can be screwed and unscrewed to the outer face (14) of one or two wheels enabling the inner cylinder to be filled with pellets through this wheel.

The attached drawings illustrate the invention:

FIG. 7 shows the plane of the two cylinders and the holes as defined for the application shown in FIG. 2 of the invention.

Figure 1:
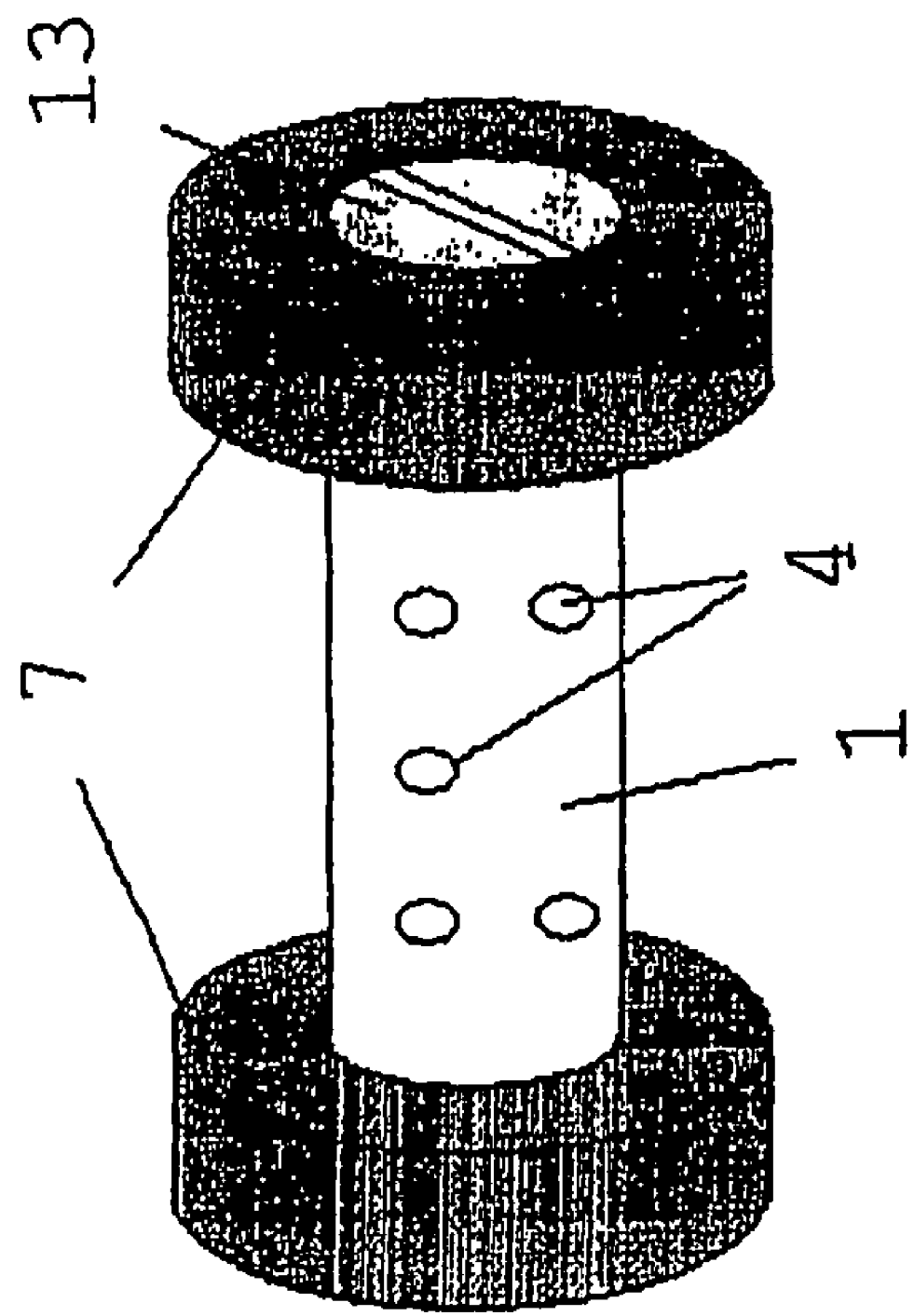
FIG. 1 shows the invention.
Figure 2:
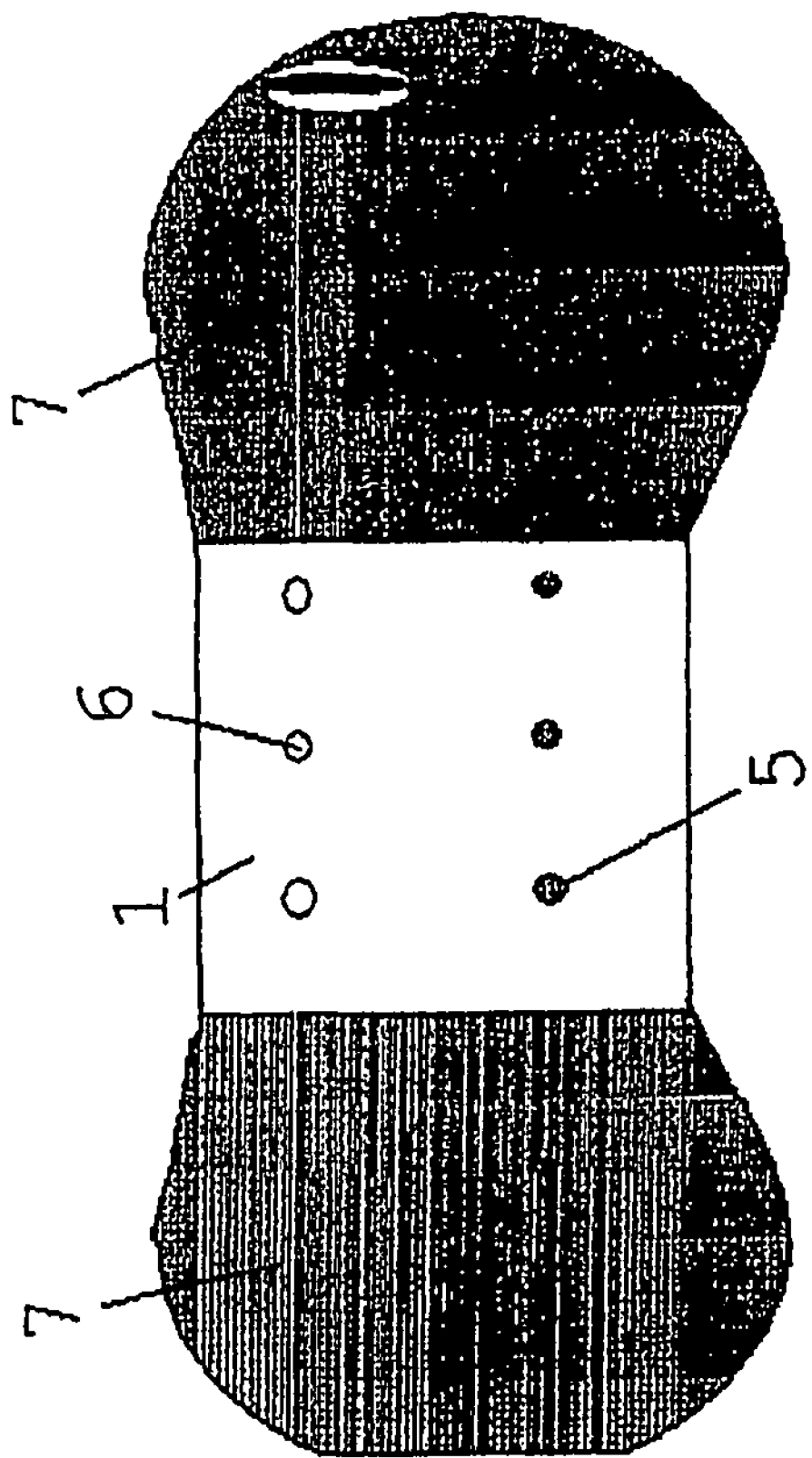
FIG. 2 shows, by way of example, an application of the invention designed more particularly for feeding cats.
Figure 3:
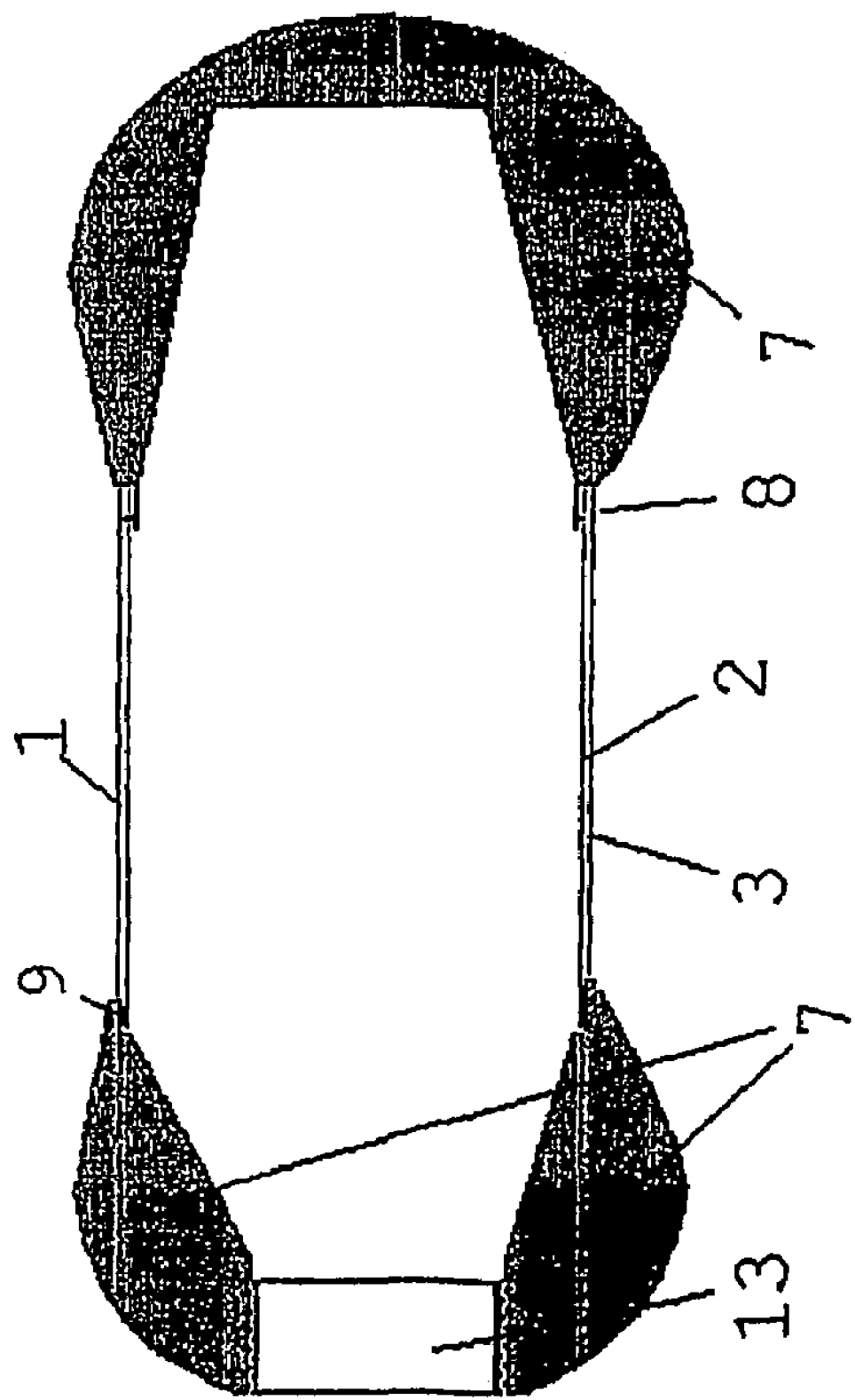
FIG. 3 shows a section through this application.
Figure 4:
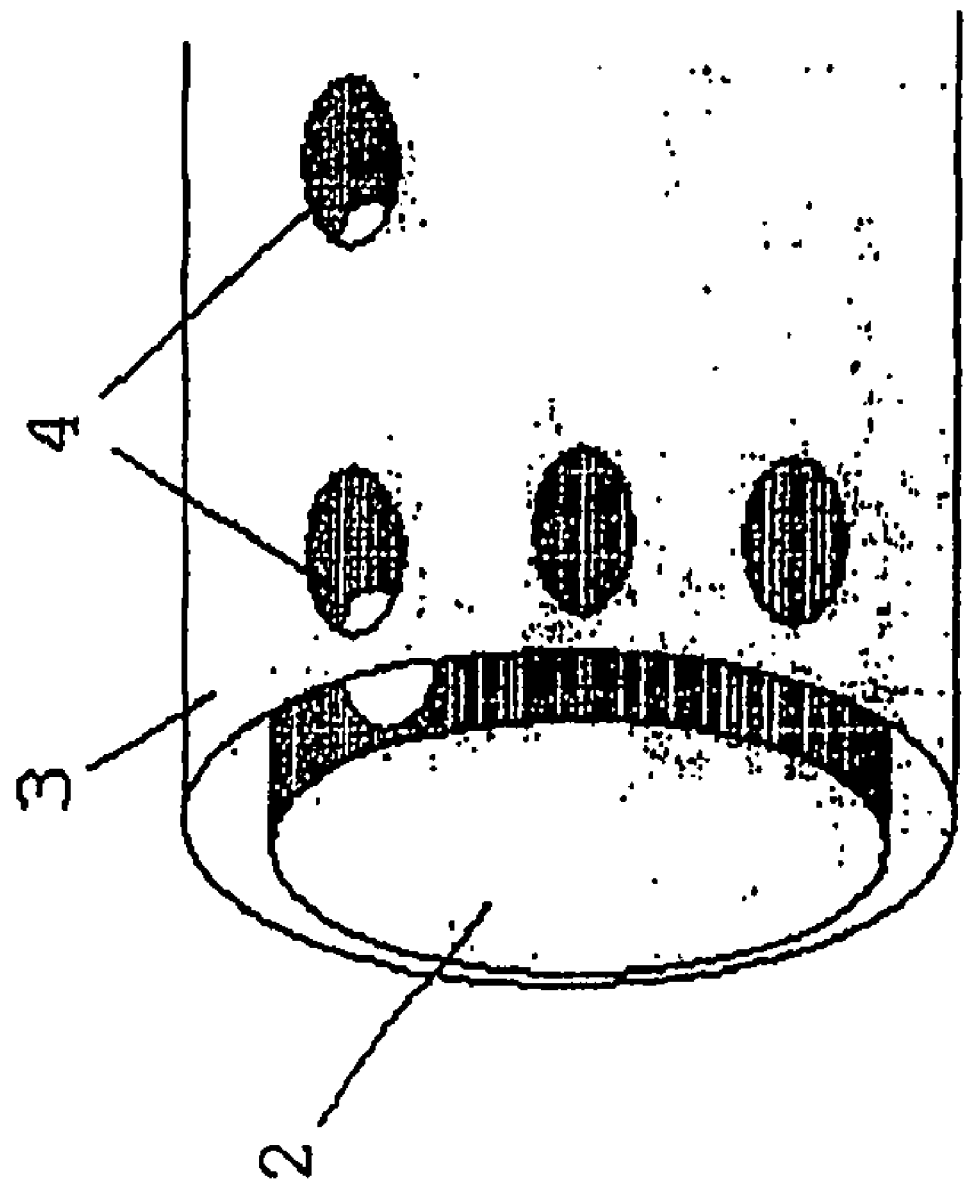
FIG. 4 shows part of the cylinders constituting the central part.
Figure 5:
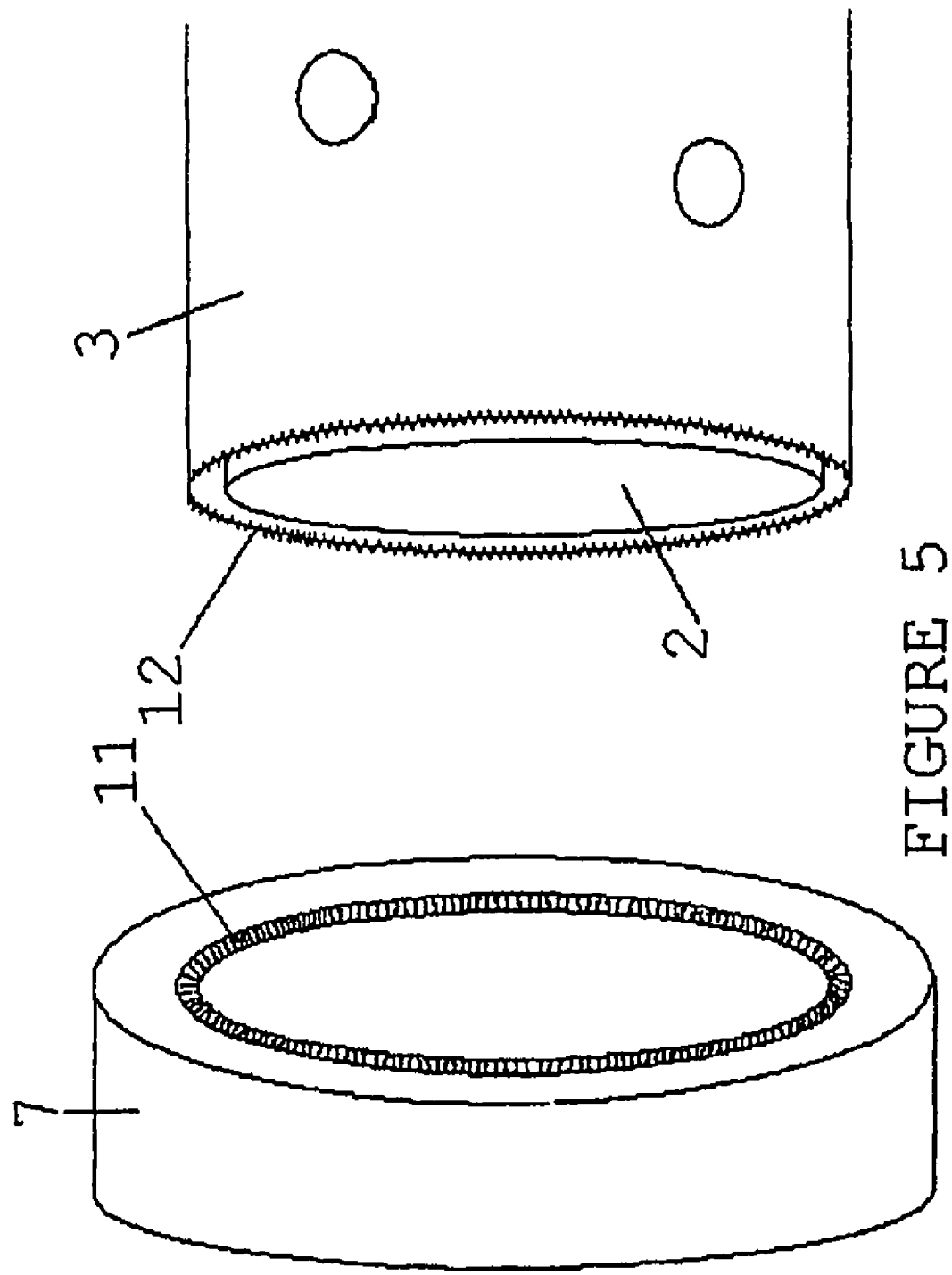
FIG. 5 shows the fourth characteristic of the invention.
Figure 6:
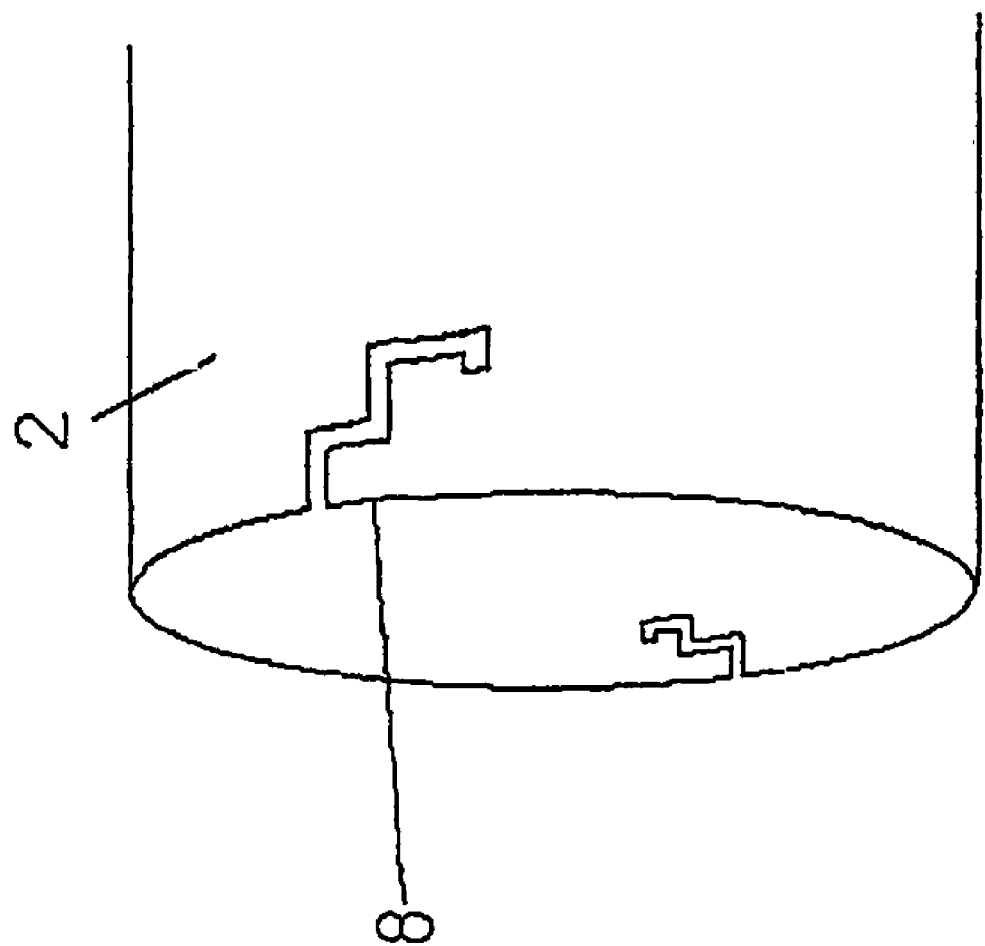
FIG. 6 shows a detail of the double bayonet system.
Figure 8:
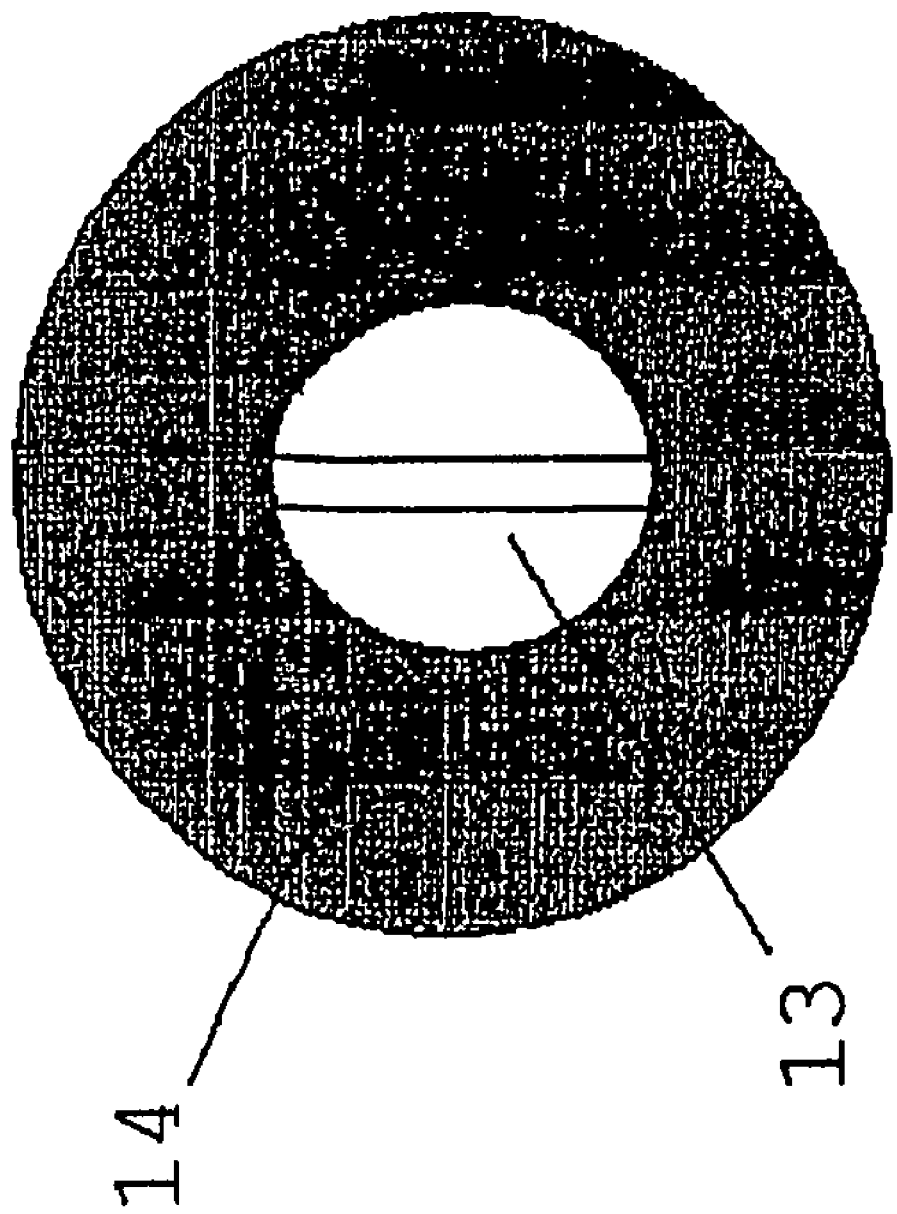
FIG. 8 shows the outer face of the wheel and stopper (13), fifth characteristic of the invention.

By way of this non-limiting example, the invention relating to the feeding of cats will have dimensions of the order of 30 cm in length, 8 cm in diameter for the central part, and 10 cm in diameter for the wheels.

In this same example, where the device consists mainly of plastic materials, it may also be used by other animals, for example ferrets, puppies and small dogs, etc.

In other more large scale applications designed for larger animals, the device may be constructed in other more resistant materials such as sheet iron or aluminium.

The invention claimed is:

1. A device for dispensing dry food in the form of pellets or cubes to animals which roll it on the ground, characterised in that it comprises a central part (1) consisting of two horizontal cylinders nested one inside the other, of the same length, free of each other, in mutual contact throughout their area, an inner cylinder (2) containing the pellets to be distributed, the other outer cylinder (3), both provided on the surface with holes (4) in a different number, and identical diameter, carefully positioned to be superimposed in a desired number thanks to an adjustment obtained by manual rotation of the outer cylinder around the inner cylinder, thereby forming channels enabling the pellets inside the inner cylinder to flow to the outside of the central part, which further comprises at the ends of the central part two wheels (7) which are fixed to the ends of the inner cylinder by exerting pressure on the ends of the outer cylinder in order to secure it to the inner cylinder so as to maintain the channels as previously adjusted.

2. The device according to claim 1, characterised in that the wheels are fixed to the inner cylinder, one of the wheels being fixed by a double bayonet system (8) in order to release the outer cylinder without fully separating the wheel from the inner cylinder during adjustment of the channels, and the other wheel being fixed by screwing or gluing (9).

3. The device according to claim 2, characterised by a rack system on the inner face (11) of the wheel screwed or glued to the inner cylinder, and on one entire end (12) of the outer cylinder (3), enabling the inner cylinder to be locked in a precise position with respect to the outer cylinder integral with that wheel, in order to match a precise number of holes (4) of the two cylinders by adjusting their alignment to obtain channels that are more or less open to the size of the pellets.

4. The device according to claim 2, characterised by the existence, on the outer face of the screwed or glued wheel, of a stopper (13) that can be screwed and unscrewed in the wheel, enabling the inner cylinder to be filled by communication via the wheel with the inside of the inner cylinder (2).

* * * * *